(12) United States Patent
Kawata et al.

(10) Patent No.: US 12,056,000 B1
(45) Date of Patent: Aug. 6, 2024

(54) ANOMALY DETECTION BY ANALYZING LOGS USING MACHINE LEARNING

(71) Applicant: Juniper Networks, Inc., Sunnyvale, CA (US)

(72) Inventors: Jerry Kawata, Nepean (CA); Manish Talwar, Lunenburg, MA (US); Avanthi Boyapati, Nashua, NH (US); Ajay Kachrani, Nashua, NH (US); Gert Grammel, Ditzingen (DE); Manjunath Ramappa Tahasildar, Ottawa (CA); Harshit Sharma, Boston, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/652,549

(22) Filed: Feb. 25, 2022

(51) Int. Cl.
*G06F 11/00* (2006.01)
*G06F 11/07* (2006.01)
*G06F 11/30* (2006.01)
*G06F 11/34* (2006.01)

(52) U.S. Cl.
CPC ........ *G06F 11/079* (2013.01); *G06F 11/0793* (2013.01); *G06F 11/3075* (2013.01); *G06F 11/3476* (2013.01)

(58) Field of Classification Search
CPC .............. G06F 11/079; G06F 11/0793; G06F 11/3075; G06F 11/3476; G06F 11/14; G06F 11/2205
USPC ...................................... 714/1–57
See application file for complete search history.

(56) References Cited

U.S. PATENT DOCUMENTS

| | | | | |
|---|---|---|---|---|
| 7,826,360 | B1* | 11/2010 | Hutchison | H04L 63/0428 370/254 |
| 8,233,751 | B2* | 7/2012 | Patel | G06V 30/40 709/225 |
| 9,917,749 | B2* | 3/2018 | Zhu | H04L 43/04 |
| 11,656,926 | B1* | 5/2023 | Dande | G06F 11/0709 714/37 |
| 2006/0187818 | A1* | 8/2006 | Fields, Jr. | G06F 11/0724 370/216 |
| 2013/0097125 | A1* | 4/2013 | Marvasti | G06F 16/90 707/E17.002 |

(Continued)

OTHER PUBLICATIONS

Hudan Studiawan et al., "Anomaly Detection in Operating System Logs with Deep Learning-Based Sentiment Analysis", IEEE Journals & Magazine, Sep.-Oct. 2021, IEEE Transactions on Dependable and Secure Computing, 3 pages, vol. 18, Issue 5, IEEE, https://ieeexplore.ieee.org/document/9259061.

(Continued)

*Primary Examiner* — Sarai E Butler
(74) *Attorney, Agent, or Firm* — Harrity & Harrity, LLP

(57) ABSTRACT

In some implementations, a device may obtain a log file that includes a plurality of log entries. The device may identify a sequence of log entries, of the plurality of log entries, that are associated with a resource. The device may process the sequence of log entries to generate a sequence of log templates. The device may process the sequence of log templates to identify an anomaly associated with the sequence of log templates. The device may determine, based on the anomaly associated with the sequence of log templates, an anomaly associated with the sequence of log entries. The device may perform, based on the anomaly associated with the sequence of log entries, one or more actions.

20 Claims, 11 Drawing Sheets

(56) References Cited

U.S. PATENT DOCUMENTS

| | | | | |
|---|---|---|---|---|
| 2015/0378865 | A1* | 12/2015 | Robertson | G06F 11/0709 |
| | | | | 714/57 |
| 2016/0124823 | A1* | 5/2016 | Ruan | G06F 11/079 |
| | | | | 714/26 |
| 2016/0224401 | A1* | 8/2016 | Adinarayan | G06F 11/0766 |
| 2016/0277268 | A1* | 9/2016 | Brown | G06F 11/3075 |
| 2020/0021511 | A1* | 1/2020 | Xu | H04L 43/08 |
| 2020/0192779 | A1* | 6/2020 | Minja | G06F 11/3476 |
| 2021/0281606 | A1* | 9/2021 | Singh | G06N 20/00 |
| 2021/0357282 | A1* | 11/2021 | Verma | G06N 3/044 |

OTHER PUBLICATIONS

Haixuan Guo et al., "LogBERT: Log Anomaly Detection via BERT", Mar. 7, 2021, 13 pages, https://arxiv.org/abs/2103.04475.

Lakshmi Geethanjali Mandagondi, "Anomaly Detection in Log Files Using Machine Learning Techniques", Faculty of Computing, Blekinge Institute of Technology, Feb. 2021, 67 pages, Sweden.

\* cited by examiner

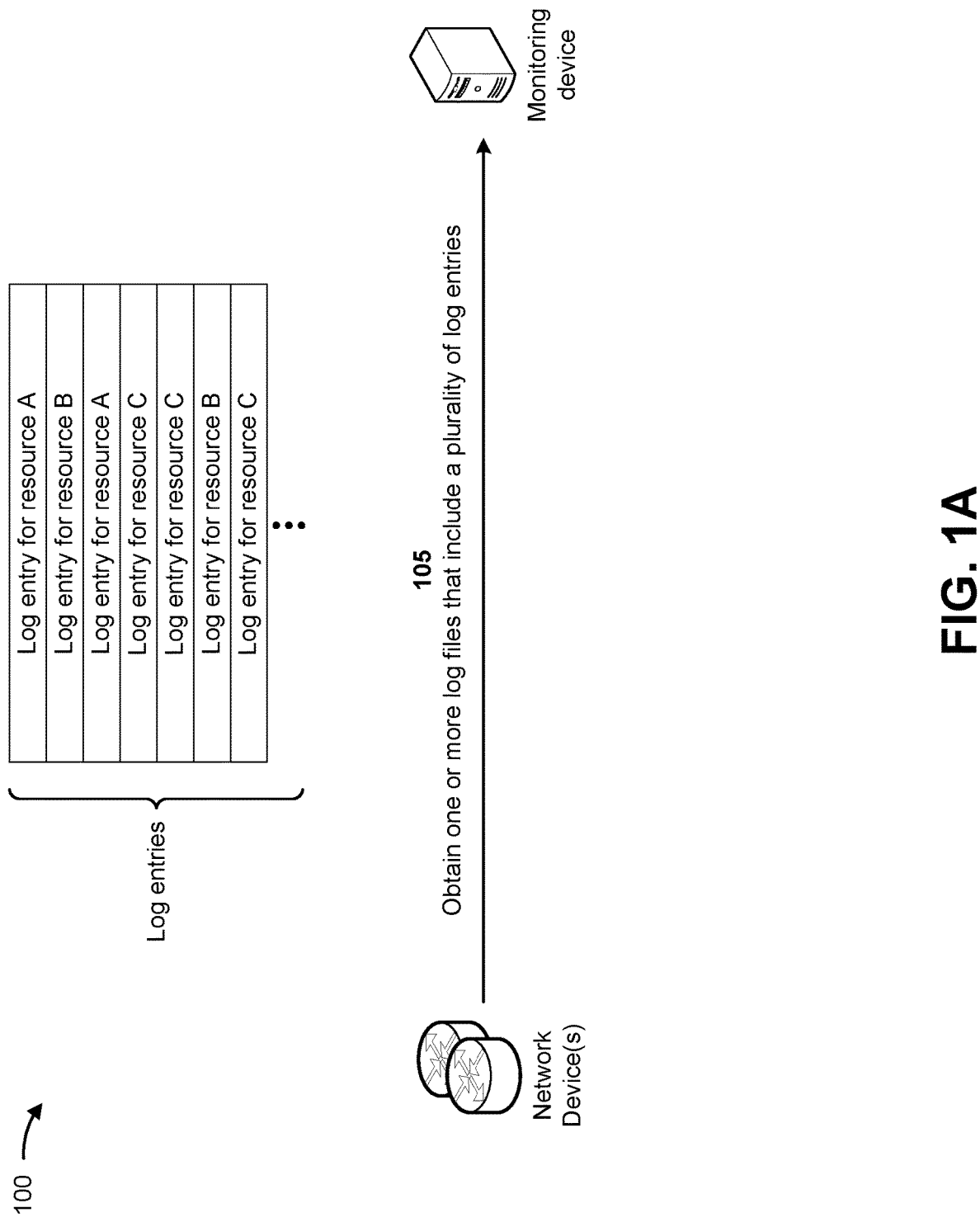

600 ⟶

610 — Obtain, by a device, a log file that includes a plurality of log entries

620 — Identify, by the device, a sequence of log entries, of the plurality of log entries, that are associated with a resource 630 — Process, by the device, the sequence of log entries to generate a sequence of log templates 640 — Process, by the device, the sequence of log templates to identify an anomaly associated with the sequence of log templates 650 — Determine, by the device and based on the anomaly associated with the sequence of log templates, an anomaly associated with the sequence of log entries 660 — Perform, by the device and based on the anomaly associated with the sequence of log entries, one or more actions

FIG. 6

ANOMALY DETECTION BY ANALYZING LOGS USING MACHINE LEARNING

BACKGROUND

A log file is a file that records log data. A log file includes one or more log entries that are associated with resources (e.g., computing resources, memory resources, networking resources, or other resources) of a device, multiple devices, or a network. Typically, each log entry includes information related to a particular event (e.g., an execution event, a status event, a communication event, or another event) that is associated with a particular resource.

SUMMARY

Some implementations described herein relate to a method. The method may include obtaining, by a device, a log file that includes a plurality of log entries. The method may include identifying, by the device, a sequence of log entries, of the plurality of log entries, that are associated with a resource. The method may include processing, by the device, the sequence of log entries to generate a sequence of log templates. The method may include processing, by the device, the sequence of log templates to identify an anomaly associated with the sequence of log templates. The method may include determining, by the device and based on the anomaly associated with the sequence of log templates, an anomaly associated with the sequence of log entries. The method may include performing, by the device and based on the anomaly associated with the sequence of log entries, one or more actions.

Some implementations described herein relate to a non-transitory computer-readable medium that stores a set of instructions for a device. The set of instructions, when executed by one or more processors of the device, may cause the device to identify, in a log file, a sequence of log entries that are associated with a resource. The set of instructions, when executed by one or more processors of the device, may cause the device to process the sequence of log entries to generate a sequence of log templates. The set of instructions, when executed by one or more processors of the device, may cause the device to process the sequence of log templates to identify an anomaly associated with the sequence of log entries. The set of instructions, when executed by one or more processors of the device, may cause the device to perform, based on the anomaly associated with the sequence of log entries, one or more actions.

Some implementations described herein relate to a device. The device may include one or more memories and one or more processors. The device may be configured to identify a sequence of log entries, included in one or more log files, that are associated with a resource. The device may be configured to process the sequence of log entries to generate a sequence of log templates. The device may be configured to process, using one or more machine learning models, the sequence of log templates to identify an anomaly associated with the sequence of log templates. The device may be configured to determine, based on the anomaly associated with the sequence of log templates, an anomaly associated with the sequence of log entries. The device may be configured to provide information identifying the anomaly associated with the sequence of log entries.

BRIEF DESCRIPTION OF THE DRAWINGS

FIGS. 1A-1F are diagrams of an example implementation described herein.

FIG. 6 is a flowchart of an example process relating to detection of an anomaly associated with a sequence of log entries.

DETAILED DESCRIPTION

Figure 1B:
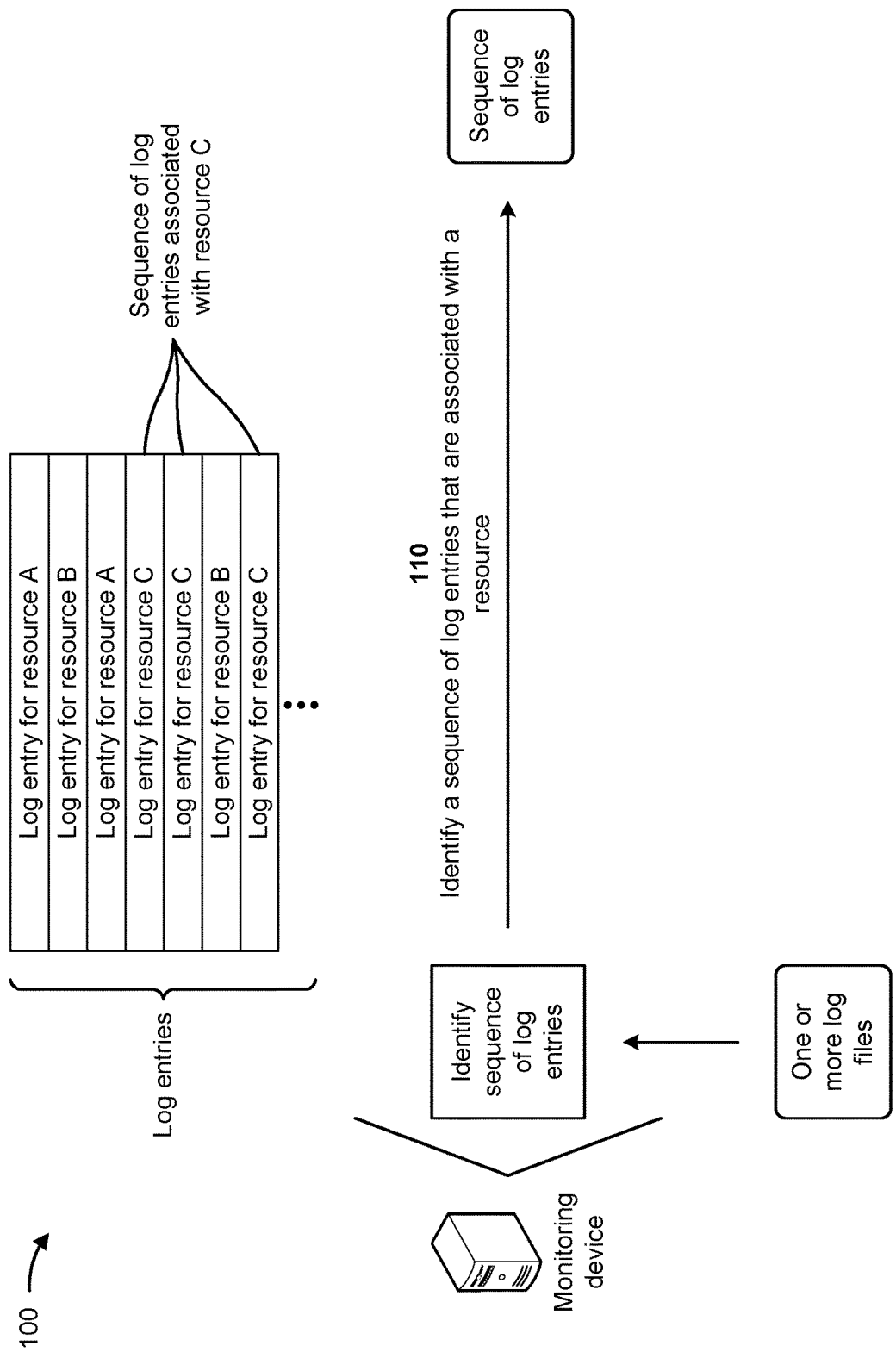

The following detailed description of example implementations refers to the accompanying drawings. The same reference numbers in different drawings may identify the same or similar elements.

In many cases, a resource (e.g., a computing resource, a memory resource, a networking resource, or another resource) associated with a device encounters an issue (e.g., an error or a malfunction). Typically, to identify the issue, an administrator needs to parse through a log file maintained by the device to identify log entries associated with the resource and recognize the issue. This is a time consuming and resource intensive process. For example, the operator needs to use computing resources (e.g., processing resources, memory resources, communication resources, and/or power resources, among other examples) of a client device to obtain the log file, parse the log file, and read and/or analyze the log entries associated with the reference. Further, when a log entry is missing or occurred out of order, the operator may need to use additional computing resources to identify the issue. Other attempts to facilitate issue identification have focused on analyzing language used in log entries, but this is not helpful when a log entry is missing or occurred out of order.

Some implementations described herein provide a monitoring device that obtains a log file and identifies a sequence of log entries in the log file that are associated with a resource (e.g., a computing resource, a memory resources, a networking resource, or another resources). The monitoring device processes the sequence of log entries to generate a sequence of log templates (e.g., where each log template, of the sequence of log templates, includes information included in a corresponding log entry, of the sequence of log entries, that has been modified). For example, the monitoring device copies valuable information (e.g., information that is important, relevant, and/or unique) of a log file to a corresponding log template and replaces other information (e.g., that is redundant, not relevant, non-unique, and/or otherwise non-important) with standardized information (e.g., placeholder information) before including it in the log template. In this way, each log template includes a simplified representation of information included in a corresponding log entry, with valuable information left unchanged.

Accordingly, the monitoring device processes (e.g., using a machine learning model, such as a long short-term memory (LSTM) machine learning model) the sequence of log templates to identify an anomaly associated with the sequence of log templates (e.g., a missing log template, a mispositioned log template, and/or a repeated log template). For example, the monitoring device the monitoring device may process the sequence of log templates using an LSTM machine learning model, where each log template, of the sequence of log templates, is treated as a "word" or a "collection of words" by the LSTM machine learning model. Using a sequence of log templates in this way (e.g., with an LSTM machine learning model) is a novel approach; using a natural language processing machine learning model in a conventional way cannot otherwise be used to identify an anomaly associated with the sequence of log templates (e.g., that may indicate an error or malfunction associated with the resource), as described herein.

Based on this anomaly associated with the sequence of log templates, the monitoring device determines an anomaly associated with the sequence of log entries (e.g., a missing log entry, a mispositioned log entry, and/or a repeated log entry). For example, the monitoring device may determine, based on a correspondence between the sequence of log templates and the sequence of log entries, the anomaly associated with the sequence of log entries (e.g., the anomaly associated with the sequence of log entries is similar to the anomaly associated with the sequence of log templates because of the correspondence). Accordingly, the monitoring device may perform one or more actions, such as provide the anomaly associated with the sequence of log entries for display, or provide a notification, which provides valuable information that can be used by an administrator to address the anomaly associated with the sequence of log entries. Additionally, or alternatively, the monitoring device may identify an origin of the anomaly associated with the sequence of log entries, and/or modify one or more configuration parameters associated with the resource (e.g., to automatically address the anomaly associated with the sequence of log entries).

In this way, the monitoring device described herein facilitates detection of an anomaly associated with a sequence of log entries that are associated with a resource. This thereby minimizes use of computing resources (e.g., processing resources, memory resources, communication resources, and/or power resources, among other examples) of another device (e.g., a client device) that would otherwise be used by an administrator to identify an issue associated with the resource. Further, by utilizing a sequence of log entries log templates (e.g., that does not include extraneous information that is included in the sequence of log entries), the monitoring device is able to use a machine learning model to efficiently identify the anomaly associated with the sequence of log templates, and therefore is able to determine the anomaly associated with the sequence of log entries. Moreover, the monitoring device is able to identify when a log entry is missing or occurred out of order, which is not possible using typical language-based analysis techniques.

FIGS. 1A-1F are diagrams of one or more example implementations 100 described herein. Example implementation(s) 100 may include a monitoring device and one or more network devices, which are described in more detail below in connection with FIGS. 3-5. The one or more network devices and/or the monitoring device may be configured to communicate with each other via a network.

As shown in FIG. 1A, and by reference number 105, the monitoring device may obtain one or more log files. For example, the one or more network devices may respectively send log files to the monitoring device. A network device may send a log file to the monitoring device on a scheduled basis (e.g., every 5 minutes, every hour, or every 12 hours), on an on-demand basis (e.g., based on a command received from the monitoring device), on a triggered basis (e.g., after a particular amount of log data is accumulated by the network device), and/or an ad-hoc basis (e.g., to facilitate detection of an anomaly associated with a sequence of log entries, as described elsewhere herein).

As further shown in FIG. 1A, the one or more log files may include a plurality of log entries. The plurality of log entries may be included in the one or more log files such that each log entry has an ordinal position within the plurality of log entries. For example, a first log entry may have a first ordinal position, a second log entry may have a second ordinal position, a third log entry may have a third ordinal position, and so on. An ordinal position of a log entry may depend on, for example, a time (e.g., a timestamp) associated with the log entry. Accordingly, the plurality of log entries may be arranged in a chronological order (e.g., an oldest-to-newest order).

Each log entry may be associated with a resource. For example, a log entry may be associated with a computing resource, a memory resource, a networking resource, and/or another resource of a network device. In a particular example, a network device may be associated with a link (e.g., a link that connects the network device to another device, such as a media access control security (MACsec) link) and the network device may maintain a log file that includes log entries associated with the link (e.g., events associated with the link, such as establishment events, status check events, error events, and/or other events). In some implementations, the log file may include multiples sets of log entries (e.g., where each set of log entries includes one or more log entries) that are associated with a respective resource. For example, as shown in FIG. 1A, the log file may include sets of log entries that are respectively associated with resources A, B, and C.

As shown in FIG. 1B, and by reference number 110, the monitoring device may identify a sequence of log entries (e.g., of the plurality of log entries of the one or more log files) associated with a resource. For example, as shown in FIG. 1B, the monitoring device may identify a sequence of log entries that are associated with the resource C. Accordingly, each log entry of the sequence of log entries may have an ordinal position within the sequence of log entries. For example, a first log entry may have a first ordinal position within the sequence of log entries, a second log entry may have a second ordinal position within the sequence of log entries, a third log entry may have a third ordinal position within the sequence of log entries, and so on. An ordinal position of a log entry within the sequence of log entries may depend on, for example, a time (e.g., a timestamp) associated with the log entry. Accordingly, the sequence of log entries may be arranged in a chronological order (e.g., an oldest-to-newest order).

Figure 1C:
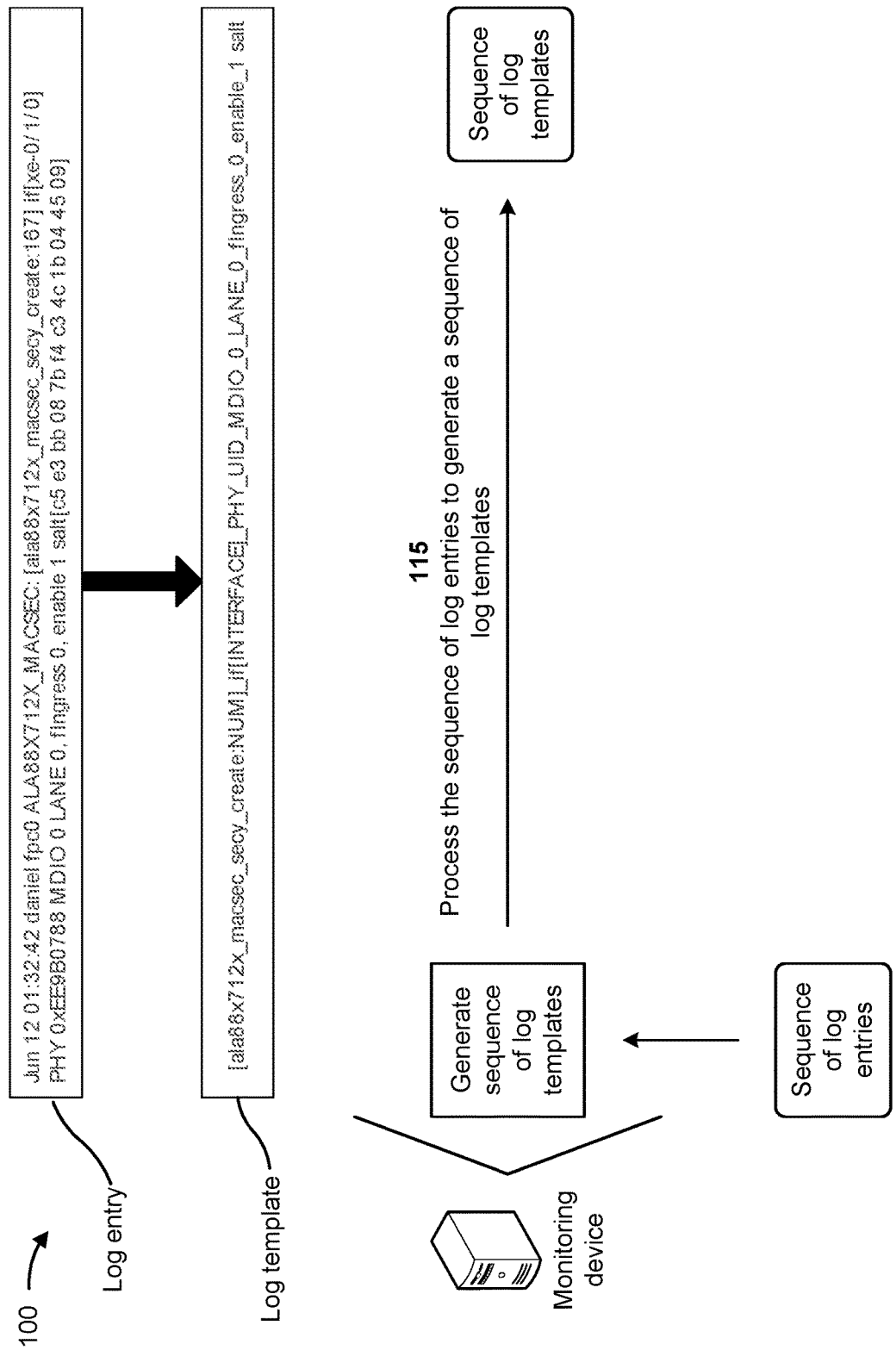

As shown in FIG. 1C, and by reference number 115, the monitoring device may process the sequence of log entries to generate a sequence of log templates. Each log template of the sequence of log templates may have an ordinal position within the sequence of log templates and may correspond to a log entry of the sequence of log entries. For example, a first log template of the sequence of log templates may have a first ordinal position within the sequence of log templates and may correspond to a first log entry of the sequence of log entries with a first ordinal position within the sequence of log entries, a second log template of the sequence of log templates may have a second ordinal position within the sequence of log templates and may correspond to a second log entry of the sequence of log entries with a second ordinal position within the sequence of log entries, and so on.

The monitoring device may generate each log template by modifying information included in a corresponding log entry. For example, the monitoring device may generate the first log template by modifying information included in the first log entry, may generate the second log template by modifying information included in the second log entry, and so on. The monitoring device may modify information included in a log entry by, for example, removing timestamp information associated with the log entry (e.g., information that indicates when the log entry was created or when an event associated with the log entry occurred); removing first particular identification information associated with the log entry (e.g., information identifying, such as when the resource associated with the log entry is a link, a particular port or a particular interface of the link); replacing second particular identification information associated with the log entry (e.g., information identifying, such as when the resource is associated with a particular network device, the particular network device) with other information (e.g., nonspecific "device" identification information); and/or removing other particular information associated with the log entry (e.g., information that is not human readable or is not related to an event associated with the log entry, such as a salt value; information indicating a line number of the log entry, such as in a log file that includes the plurality of log entries; and/or other information). In this way, each log template may include valuable information (e.g., information that is important, relevant, and/or unique), from a corresponding log entry, that is useful for later processing (e.g., as described herein in relation to FIG. 1D), and other information (e.g., that is redundant, not relevant, non-unique, and/or otherwise non-important), from the corresponding log entry, that is replaced with standardized information (e.g., placeholder information) or removed (e.g., to enable more efficient processing of the valuable information).

In a particular example, as further shown in FIG. 1C, the monitoring device may generate a log template by removing timestamp information (e.g., shown as "Jun 12 01:32:42 daniel fpc0 ALA88X712X_MACSEC:") associated with a log entry, replacing particular identification information associated with the log entry with other information (e.g., "167" is replaced with "NUM," xe-0/1/0 is replaced with "INTERFACE," and "0xEE9B0788" is replaced with "UID"), and removing other particular information associated with the log entry (e.g., shown as "c5 e3 bb 08 7b f4 c3 4c 1b 04 45 09". The monitoring device may concatenate any remaining information of the log entry to form a single string (e.g., replace spaces (" ") with underscores ("_")). Accordingly, the log template includes unmodified information (e.g., from the log entry (e.g., valuable information) and modified information (e.g., other information that has been standardized) from the log entry.

Figure 1D:
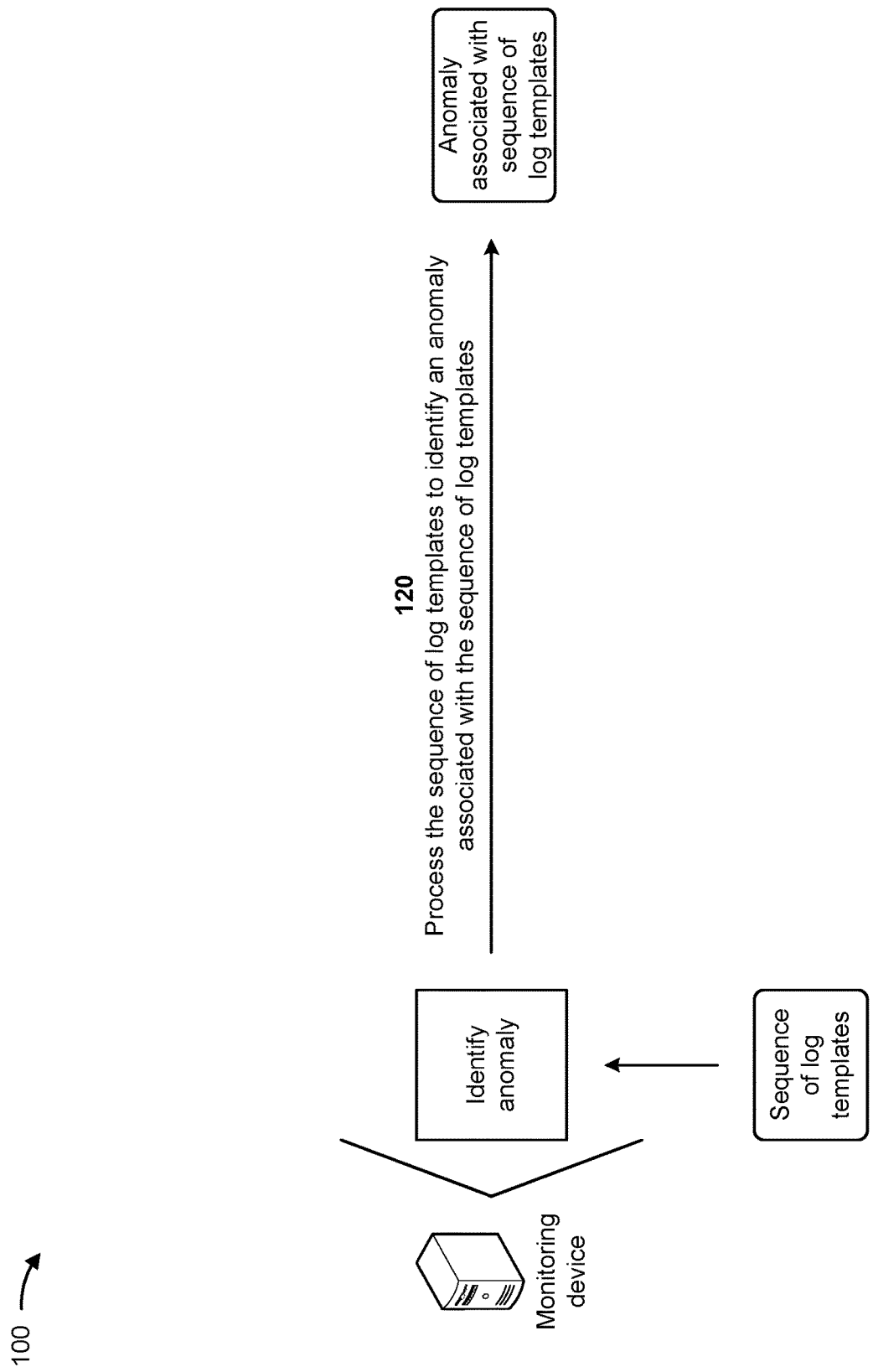

As shown in FIG. 1D, and by reference number 120, the monitoring device may process the sequence of log templates to identify an anomaly associated with the sequence of log templates. The anomaly associated with the sequence of log templates may include information identifying an ordinal position (e.g., a line number) in the sequence of log templates and an issue associated with the sequence of log templates. For example, the anomaly associated with the sequence of log templates may include information indicating a first ordinal position in the sequence of log templates where a first log template is missing from the sequence of log templates, information indicating a second ordinal position in the sequence of log templates where a second log template, of the sequence of log templates, is incorrectly positioned in the sequence of log templates (e.g., the second log template is out-of-order within the sequence of log templates), information indicating a third ordinal position in the sequence of log templates where a third log template, of the sequence of log templates, is repeated in the sequence of log templates (e.g., the third log template appears elsewhere in the sequence of log templates), and/or other information. In some implementations, the monitoring device may determine that a particular log template is missing from the sequence of log templates and may determine, based on determining that the particular log template is missing, that one or more other log templates are incorrectly positioned in the sequence of log templates and/or that one or more other log templates are repeated in the sequence of log templates.

In some implementations, the monitoring device may process the sequence of log templates using one or more machine learning models, such as a recurrent neural network (RNN) model (e.g., a long short-term memory (LSTM) machine learning model) and/or a similar machine learning model, to identify the anomaly associated with the sequence of log templates. In some implementations, the monitoring device may process the sequence of log templates using an LSTM machine learning model, where each log template, of the sequence of log templates, is treated as a "word" or a "collection of words" by the LSTM machine learning model. For example, when the log templates are treated as words, the monitoring device may use a static embedding technique or a context-aware embedding technique (e.g., an embeddings from language models (ELMO) technique, a bidirectional encoder representations from transformers (BERT) technique, or another transformer based model technique) to determine embeddings (e.g., vector representations) of the log templates and may process the embeddings using the LSTM machine learning model to identify the anomaly associated with the sequence of log templates. As another example, when the log templates are treated as a collection of words, the monitoring device may use an embedding technique (e.g., a one-dimensional convolutional neural network (1D CNN) embedding technique, an LSTM embedding technique, or another embedding technique) to determine embeddings of "characters" of individual words of each collection of words (e.g., that is associated with a log template) and then combine these embeddings to determine embeddings of the individual words. The monitoring device then may use the same or a different embedding technique (e.g., a same or different 1D CNN embedding technique, LSTM embedding technique, or another embedding technique) on the embeddings of the individual words to determine an embedding of the collection of words (e.g., an embedding of the log template). Accordingly, the monitoring device may process the embeddings associated with each collections of words using the LSTM machine learning model to identify the anomaly associated with the sequence of log templates.

In some implementations, the monitoring device may train a machine learning model based on historical data (e.g., historical sequences of log templates) and/or additional information, such as information identifying a "good" sequence of log templates (e.g., without anomalies associated with the sequence of log templates) and/or information identifying a "bad" sequence of log templates (e.g., that identifies anomalies associated with the sequences of log templates. Using the historical data and/or the additional information as inputs to the machine learning model, the server device may train the machine learning model to identify an anomaly associated with a sequence of log templates. In some implementations, the machine learning model may be trained and/or used in a manner similar to that described below with respect to FIG. 2.

Figure 1E:
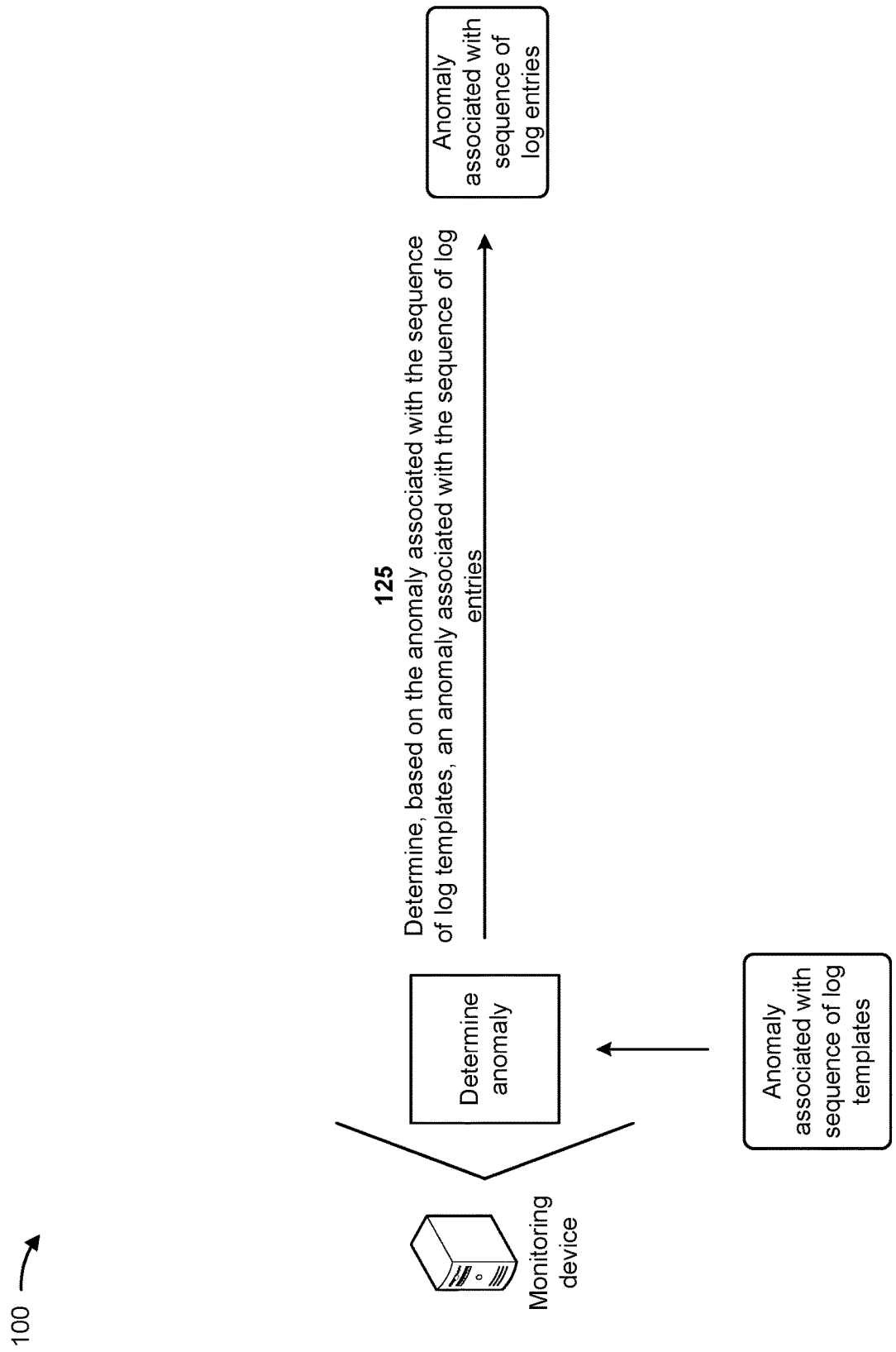

As shown in FIG. 1E, and by reference number 125, the monitoring device may determine an anomaly associated with the sequence of log entries (e.g., based on the anomaly associated with the sequence of log templates). The anomaly associated with the sequence of log entries may include information identifying an ordinal position (e.g., a line number) in the sequence of log entries and an issue associated with the sequence of log entries. For example, the anomaly associated with the sequence of log entries may include information indicating a first ordinal position in the sequence of log entries where a first log entry is missing from the sequence of log entries, information indicating a second ordinal position in the sequence of log entries where a second log entry, of the sequence of log entries, is incorrectly positioned in the sequence of log entries (e.g., the second log entry is out-of-order within the sequence of log entries), information indicating a third ordinal position in the sequence of log entries where a third log entry, of the sequence of log entries, is repeated in the sequence of log entries (e.g., the third log entry appears elsewhere in the sequence of log entries), and/or other information.

In some implementations, to determine the anomaly associated with the sequence of log entries, the monitoring device may identify a correspondence between the sequence of log entries and the sequence of log templates (e.g., identify that a particular log entry, of the sequence of log entries, has an ordinal position within the sequence of log entries that is the same as an ordinal position within the sequence of log templates of a particular log template, of the sequence of log templates, that was generated based on the particular log entry). The monitoring device may identify, based on the correspondence and an ordinal position in the sequence of log templates indicated by the anomaly associated with the sequence of log templates, an ordinal position in the sequence of log entries. For example, the monitoring device may determine, based on the correspondence, that the ordinal position in the sequence of log entries is the same as the ordinal position in the sequence of log templates. The monitoring device may identify, based on the correspondence and an issue associated with the sequence of log templates indicated by the anomaly associated with the sequence of log templates, an issue associated with the sequence of log entries. For example, the monitoring device may determine, based on the correspondence, that the issue associated with the sequence of log entries is the same as the issue associated with the sequence of log templates. Accordingly, the monitoring device may determine the anomaly associated with the sequence of log entries (e.g., based on the ordinal position in the sequence of log entries and the issue associated with the sequence of log entries). For example, the monitoring device may determine the anomaly associated with the sequence of log entries to include information indicating the ordinal position in the sequence of log entries and the issue associated with the sequence of log entries.

Figure 1F:
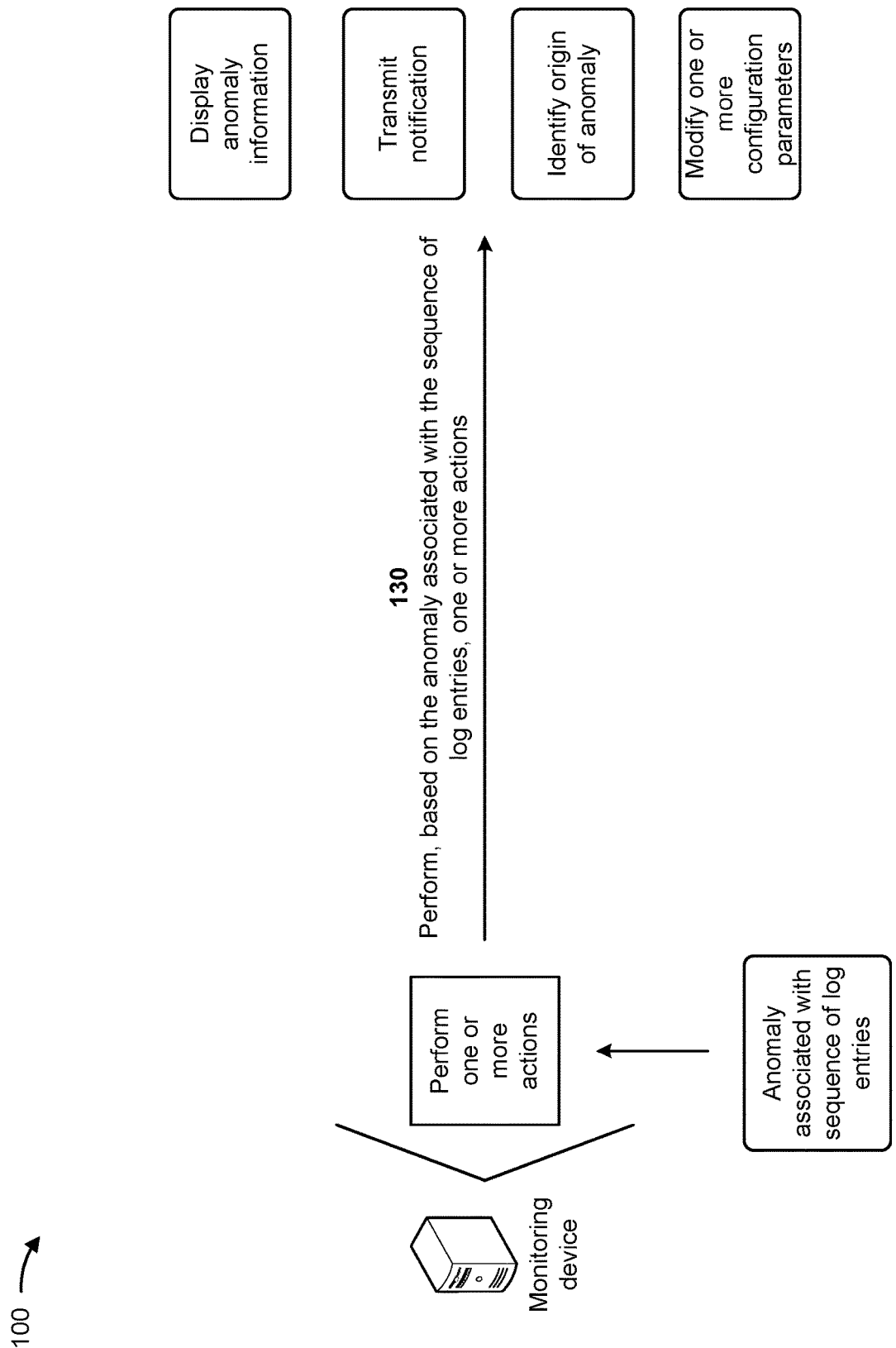

As shown in FIG. 1F, and by reference number 130, the monitoring device may perform one or more actions (e.g., based on the anomaly associated with the sequence of log entries). For example, the monitoring device may provide (e.g., to another device, such as a network device or a client device) information identifying the anomaly associated with the sequence of log entries. This may cause display of the information identifying the anomaly associated with the sequence of log entries (e.g., on a display screen of the other device). As another example, the monitoring device may send a notification identifying an anomaly associated with the sequence of log entries to the other device. In this way, the monitoring device may provide information (e.g., diagnostic information) that can be used by an administrator to address the anomaly associated with the sequence of log entries (e.g., to fix software that caused the anomaly). Additionally, or alternatively, the monitoring device may modify, based on the information identifying the anomaly associated with the sequence of log entries, one or more configuration parameters associated with the resource (e.g., that is associated with the sequence of log entries). In this way, the monitoring device may automatically take action to address the anomaly associated with the sequence of log entries.

In some implementations, the monitoring device may obtain (e.g., based on the anomaly associated with the sequence of log entries) information associated with the resource. For example, the monitoring device may obtain (e.g., from the one or more network devices and/or the monitoring device) telemetry data, statistical data, configuration data, traffic-related data, and/or other data associated with the resource. Accordingly, the monitoring device may cause the information identifying the anomaly associated with the sequence of log entries and the information associated with the resource to be analyzed (e.g., by the monitoring device or another device) using a root cause analysis (RCA) technique to identify an origin of the anomaly associated with the sequence of log entries (e.g., that indicates a reason why the anomaly occurred). Accordingly, the monitoring device may provide (e.g., for display) at least one of the information identifying the anomaly associated with the sequence of log entries, the information associated with the resource, or information identifying the origin of the anomaly associated with the sequence of log entries. Additionally, or alternatively, the monitoring device may modify, based on at least one of the information identifying the anomaly associated with the sequence of log entries, the information associated with the resource, or information identifying the origin of the anomaly associated with the sequence of log entries, one or more configuration parameters associated with the resource (e.g., to cause the network device to restore to an initial state or a safe state, such that conditions for causing the anomaly are removed). In this way, the monitoring device may provide information that can be used by an administrator to address the anomaly associated with the sequence of log entries and/or may automatically take action to address the anomaly associated with the sequence of log entries.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F. For example, a network device, of the one or more network devices, may perform one or more functions described as being performed by the monitoring device, or vice versa.

Figure 2:
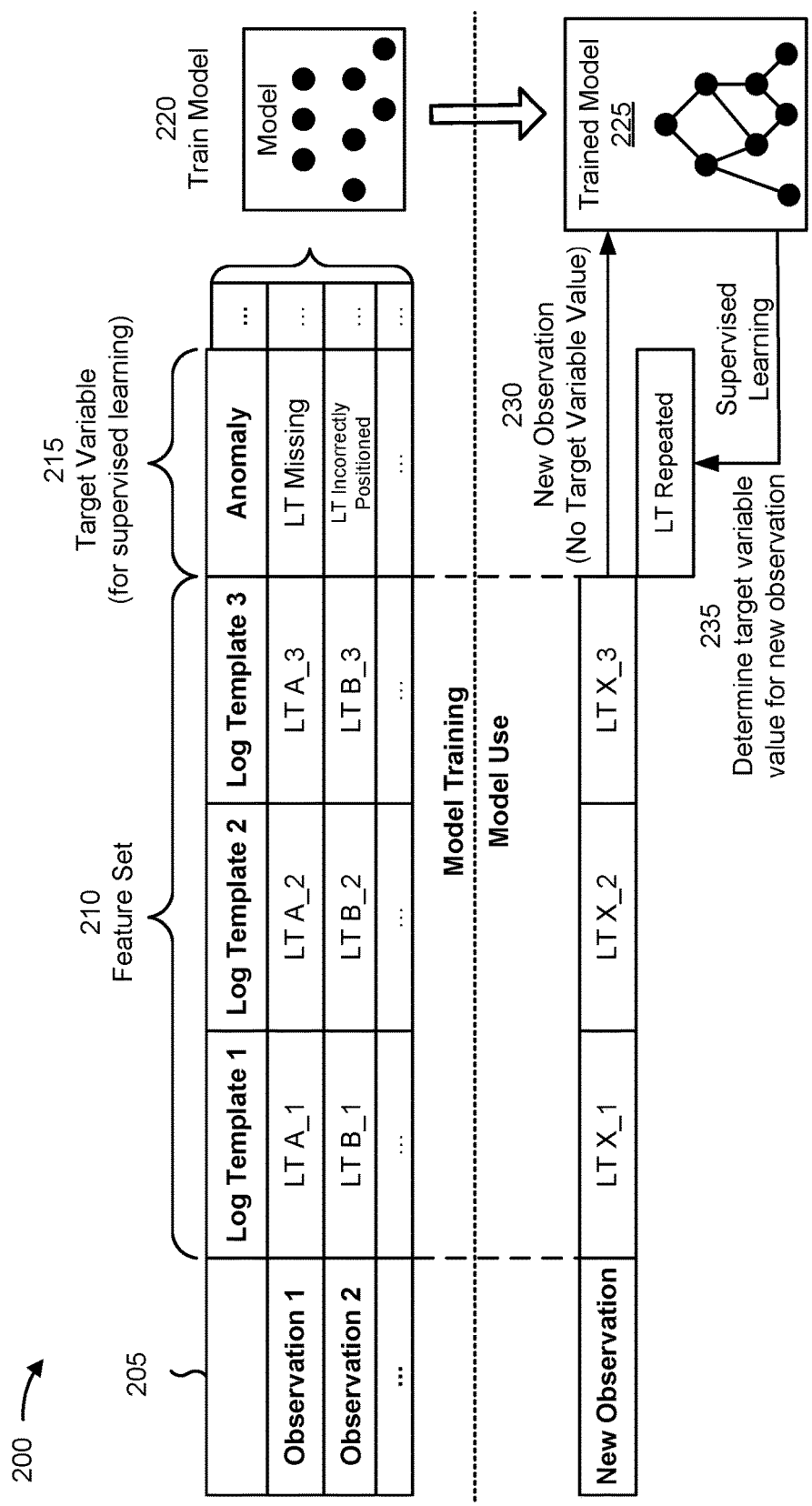
FIG. 2 is a diagram illustrating an example of training and using a machine learning model in connection with example implementations described herein.

FIG. 2 is a diagram illustrating an example 200 of training and using a machine learning model in connection with detection of an anomaly associated with a sequence of log templates. The machine learning model training and usage described herein may be performed using a machine learning system. The machine learning system may include or may be included in a computing device, a server, a cloud computing environment, or the like, such as the one or more network devices and/or the monitoring device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the one or more network devices and/or the monitoring device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the one or more network devices and/or the monitoring device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of Log Template 1, a second feature of Log Template 2, a third feature of Log Template 3, and so on of a sequence of log templates. As shown, for a first observation, the first feature may have a value of LT A_1, the second feature may have a value of LT A_2, the third feature may have a value of LT A_3, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is Anomaly (e.g., that is associated with a sequence of log templates), which has a value of LT Missing for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of LT X_1, a second feature of LT X_2, a third feature of LT X_3, and so on (e.g., of a sequence of log templates), as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of LT Repeated for the target variable of Anomaly (e.g., that is associated with the sequence of log templates) for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, to provide information identifying the anomaly associated with the sequence of log templates (e.g., for display). The first automated action may include, for example, modifying one or more configuration parameters associated with a resource that is associated with the sequence of log templates.

In this way, the machine learning system may apply a rigorous and automated process to identifying an anomaly associated with a sequence of log templates. The machine learning system enables recognition and/or identification of tens, hundreds, thousands, or millions of features and/or feature values for tens, hundreds, thousands, or millions of observations, thereby increasing accuracy and consistency and reducing delay associated with identifying an anomaly associated with a sequence of log templates relative to requiring computing resources to be allocated for tens, hundreds, or thousands of operators to manually identify an anomaly associated with a sequence of log templates using the features or feature values.

As indicated above, FIG. 2 is provided as an example. Other examples may differ from what is described in connection with FIG. 2.

Figure 3:
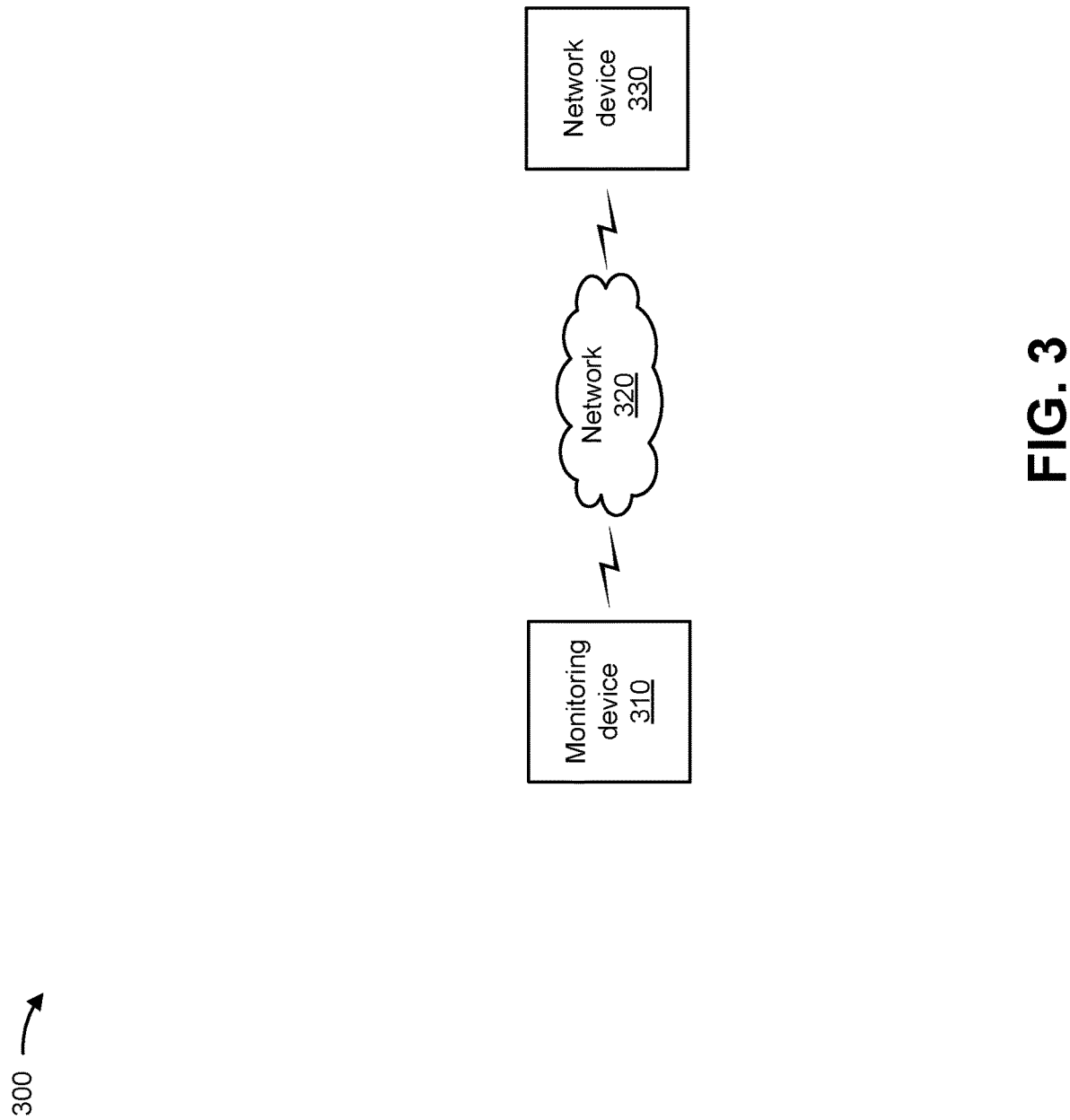
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may a monitoring device 310, a network 320, and/or one or more network devices 330. Devices and/or elements of environment 300 may interconnect via wired connections and/or wireless connections.

Monitoring device 310 includes one or more devices capable of receiving, generating, storing, processing, providing, and/or routing information related to detection of an anomaly associated with a sequence of log entries, as described elsewhere herein. Monitoring device 310 may include a communication device and/or a computing device. For example, monitoring device 310 may include a server, such as an application server, a client server, a web server, a database server, a host server, a proxy server, a virtual server (e.g., executing on computing hardware), or a server in a cloud computing system. In some implementations, monitoring device 310 includes computing hardware used in a cloud computing environment.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

Network device 330 includes one or more devices capable of receiving, processing, storing, routing, and/or providing information related to detection of an anomaly associated with a sequence of log entries, as described elsewhere herein. For example, network device 330 may include a router, such as a label switching router (LSR), a label edge router (LER), an ingress router, an egress router, a provider router (e.g., a provider edge router or a provider core router), a virtual router, or another type of router. Additionally, or alternatively, network device 330 may include a gateway, a switch, a firewall, a hub, a bridge, a reverse proxy, a server (e.g., a proxy server, a cloud server, or a data center server), a load balancer, and/or a similar device. In some implementations, network device 330 may be a physical device implemented within a housing, such as a chassis. In some implementations, network device 330 may be a virtual device implemented by one or more computer devices of a cloud computing environment or a data center. In some implementations, a group of network devices 330 may be a group of data center nodes that are used to route traffic flow through network 320.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
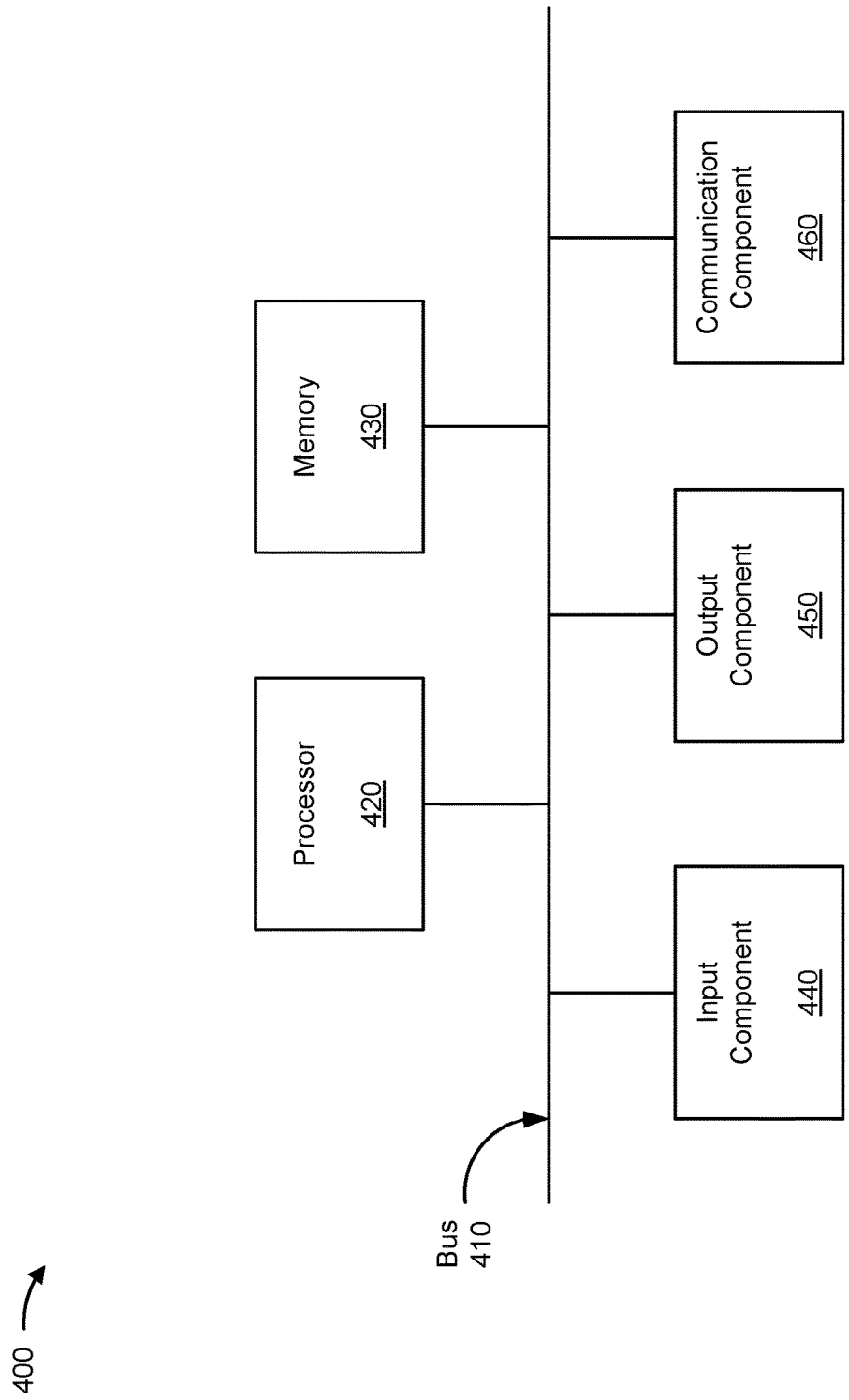
FIGS. 4-5 are diagrams of example components of one or more devices of FIG. 2.

FIG. 4 is a diagram of example components of a device 400, which may correspond to monitoring device 310 and/or network device 330. In some implementations, monitoring device 310 and/or network device 330 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
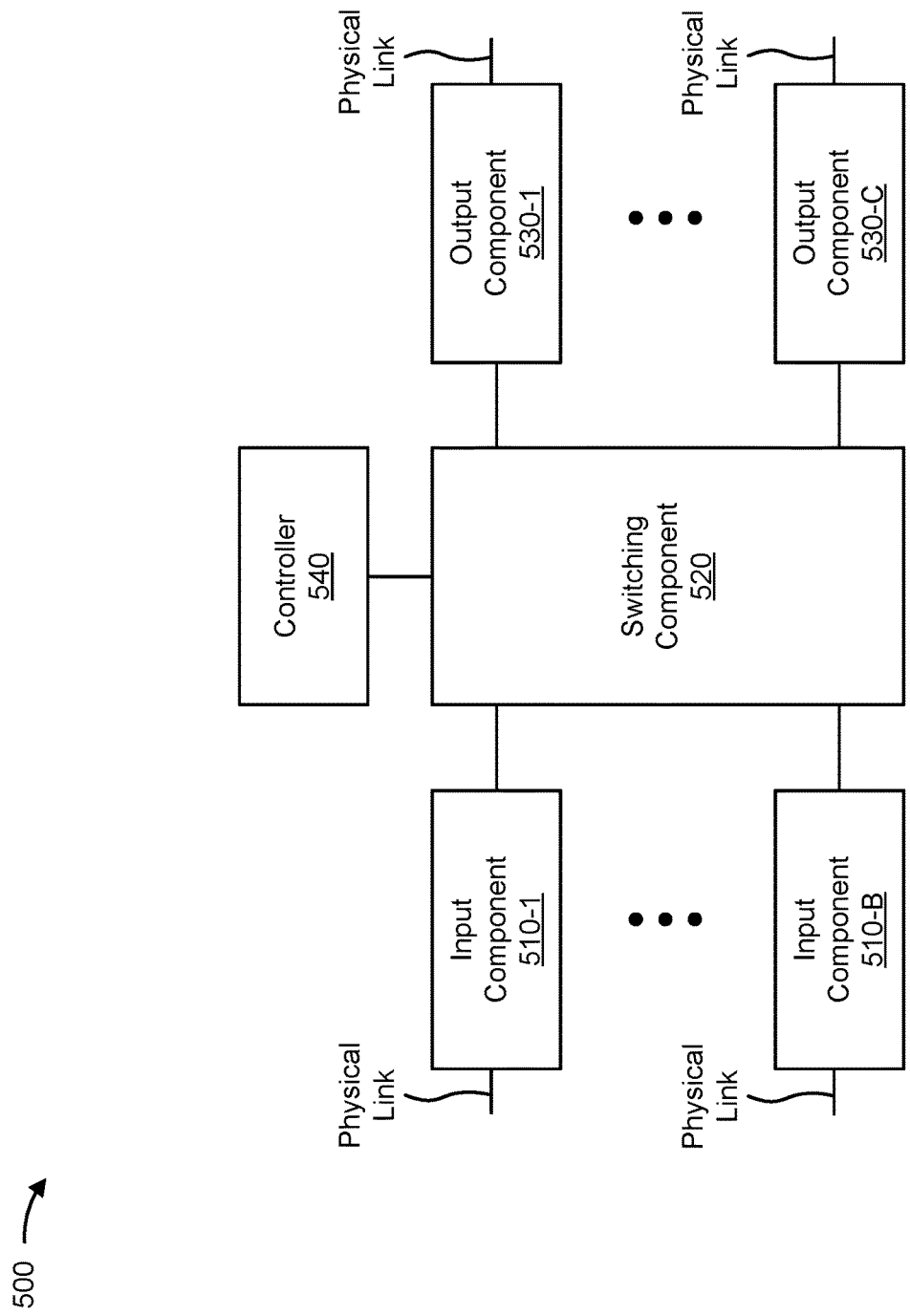

FIG. 5 is a diagram of example components of a device 500. Device 500 may correspond to monitoring device 310 and/or network device 330. In some implementations, monitoring device 310 and/or network device 330 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

FIG. 6 is a flowchart of an example process 600 associated with detection of an anomaly associated with a sequence of log entries. In some implementations, one or more process blocks of FIG. 6 are performed by a device (e.g., monitoring device 310). In some implementations, one or more process blocks of FIG. 6 are performed by another device or a group of devices separate from or including the device, such a network device (e.g., network device 330). Additionally, or alternatively, one or more process blocks of FIG. 6 may be performed by one or more components of device 400, such as processor 420, memory 430, input component 440, output component 450, and/or communication component 460; one or more components of device 500, such as input component 510, switching component 520, output component 530, and/or controller 540; and/or one or more other components.

As shown in FIG. 6, process 600 may include obtaining a log file that includes a plurality of log entries (block 610). For example, the device may obtain a log file that includes a plurality of log entries, as described above.

As further shown in FIG. 6, process 600 may include identifying a sequence of log entries, of the plurality of log entries, that are associated with a resource (block 620). For example, the device may identify a sequence of log entries, of the plurality of log entries, that are associated with a resource, as described above.

As further shown in FIG. 6, process 600 may include processing the sequence of log entries to generate a sequence of log templates (block 630). For example, the device may process the sequence of log entries to generate a sequence of log templates, as described above.

As further shown in FIG. 6, process 600 may include processing the sequence of log templates to identify an anomaly associated with the sequence of log templates (block 640). For example, the device may process the sequence of log templates to identify an anomaly associated with the sequence of log templates, as described above.

As further shown in FIG. 6, process 600 may include determining, based on the anomaly associated with the sequence of log templates, an anomaly associated with the sequence of log entries (block 650). For example, the device may determine, based on the anomaly associated with the sequence of log templates, an anomaly associated with the sequence of log entries, as described above.

As further shown in FIG. 6, process 600 may include performing, based on the anomaly associated with the sequence of log entries, one or more actions (block 660). For example, the device may perform, based on the anomaly associated with the sequence of log entries, one or more actions, as described above.

Process 600 may include additional implementations, such as any single implementation or any combination of implementations described below and/or in connection with one or more other processes described elsewhere herein.

In a first implementation, the resource is associated with another device, wherein obtaining the log file comprises receiving the log file from the other device.

In a second implementation, alone or in combination with the first implementation, the resource is a MACsec link associated with the device.

In a third implementation, alone or in combination with one or more of the first and second implementations, processing the sequence of log entries to generate the sequence of log templates comprises, for each log entry of the sequence of log entries, at least one of removing timestamp information associated with the log entry, removing first particular identification information associated with the log entry, replacing second particular identification information associated with the log entry with other information, or removing other particular information associated with the log entry.

In a fourth implementation, alone or in combination with one or more of the first through third implementations, processing the sequence of log templates to identify the anomaly associated with the sequence of log templates comprises processing, using an LSTM machine learning model, the sequence of log templates to identify the anomaly associated with the sequence of log templates.

In a fifth implementation, alone or in combination with one or more of the first through fourth implementations, the anomaly associated with the sequence of log templates includes at least one of information indicating a first ordinal position in the sequence of log templates where a first log template is missing from the sequence of log templates, information indicating a second ordinal position in the sequence of log templates where a second log template, of the sequence of log templates, is incorrectly positioned in the sequence of log templates, or information indicating a third ordinal position in the sequence of log templates where a third log template, of the sequence of log templates, is repeated in the sequence of log templates.

In a sixth implementation, alone or in combination with one or more of the first through fifth implementations, the anomaly associated with the sequence of log templates includes particular information identifying an ordinal position in the sequence of log templates and an issue associated with the sequence of log templates, wherein determining the anomaly associated with the sequence of log entries comprises identifying a correspondence between the sequence of log entries and the sequence of log templates, identifying, based on the correspondence and the ordinal position in the sequence of log templates identified by the particular information, an ordinal position in the sequence of log entries, identifying, based on the correspondence and the issue associated with the sequence of log templates identified by the particular information, an issue associated with the sequence of log entries, and determining, based on the ordinal position in the sequence of log entries and issue associated with the sequence of log entries, the anomaly associated with the sequence of log entries.

In a seventh implementation, alone or in combination with one or more of the first through sixth implementations, performing the one or more actions comprises providing information identifying the anomaly associated with the sequence of log entries for display.

In an eighth implementation, alone or in combination with one or more of the first through seventh implementations, performing the one or more actions comprises obtaining, based on the anomaly associated with the sequence of log entries, information associated with the resource, and causing information identifying the anomaly associated with the sequence of log entries and the information associated with the resource to be analyzed using a root cause analysis technique, wherein causing the information identifying the anomaly associated with the sequence of log entries and the information associated with the resource to be analyzed using the root cause analysis technique is to cause an origin of the anomaly associated with the sequence of log entries to be identified.

In a ninth implementation, alone or in combination with one or more of the first through eighth implementations, process 600 includes at least one of providing, for display, at least one of the information identifying the anomaly associated with the sequence of log entries, the information associated with the resource, or information identifying the origin of the anomaly associated with the sequence of log entries, or modifying, based on at least one of the information identifying the anomaly associated with the sequence of log entries, the information associated with the resource, or information identifying the origin of the anomaly associated with the sequence of log entries, one or more configuration parameters associated with the resource.

In a tenth implementation, alone or in combination with one or more of the first through ninth implementations, the anomaly associated with the sequence of log entries includes at least one of information indicating a first ordinal position in the sequence of log entries where a first log entry is missing from the sequence of log entries, information indicating a second ordinal position in the sequence of log entries where a second log entry, of the sequence of log entries, is incorrectly positioned in the sequence of log entries, or information indicating a third ordinal position in the sequence of log entries where a third log entry, of the sequence of log entries, is repeated in the sequence of log entries.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising: obtaining, by a device, a log file that includes a plurality of log entries associated with a resource, of the device or another device, associated with the device or the other device encountering an issue with one or more log entries of the plurality of log entries; identifying, by the device, a sequence of the plurality of log entries; generating, by the device and based on the sequence of the plurality of log entries, a sequence of a plurality of log templates, wherein each log template of the plurality of log templates corresponds to a particular log entry of the plurality of log entries; processing, by the device, the sequence of the plurality of log templates to identify an anomaly associated with the sequence of the plurality of log templates; determining, by the device and based on the anomaly associated with the sequence of the plurality of log templates, an anomaly associated with the sequence of the plurality of log entries; obtaining, based on determining the anomaly associated with the sequence of the plurality of log entries, information associated with the resource; and modifying, by the device, one or more configuration parameters, based on the information associated with the resource, to automatically take action to address the anomaly associated with the sequence of the plurality of log entries.

2. The method of claim 1, wherein the resource is associated with the other device, and
    wherein obtaining the log file comprises:
        receiving the log file from the other device.

3. The method of claim 1, wherein the resource is a media access control security (MACsec) link associated with the device.

4. The method of claim 1, wherein generating the sequence of the plurality of log templates comprises at least one of:
    removing timestamp information associated with the particular log entry;
    removing first particular identification information associated with the particular log entry;
    replacing second particular identification information associated with the particular log entry with other information; or
    removing other particular information associated with the particular log entry.

5. The method of claim 1, wherein processing the sequence of the plurality of log templates to identify the anomaly associated with the sequence of the plurality of log templates comprises:
    processing, using a long short-term memory (LSTM) machine learning model, the sequence of the plurality of log templates to identify the anomaly associated with the sequence of the plurality of log templates.

6. The method of claim 1, wherein the anomaly associated with the sequence of the plurality of log templates includes at least one of:
    information indicating a first ordinal position in the sequence of the plurality of log templates where a first log template is missing from the sequence of the plurality of log templates; or
    information indicating a second ordinal position in the sequence of the plurality of log templates where a second log template, of the sequence of the plurality of log templates, is incorrectly positioned in the sequence of the plurality of log templates.

7. The method of claim 1, wherein the anomaly associated with the sequence of the plurality of log templates includes particular information identifying an ordinal position in the sequence of the plurality of log templates and an issue associated with the sequence of the plurality of log templates,
    wherein determining the anomaly associated with the sequence of the plurality of log entries comprises:
        identifying a correspondence between the sequence of the plurality of log entries and the sequence of the plurality of log templates;
        identifying, based on the correspondence and the ordinal position in the sequence of the plurality of log templates identified by the particular information, an ordinal position in the sequence of the plurality of log entries;
identifying, based on the correspondence and the issue associated with the sequence of the plurality of log templates identified by the particular information, an issue associated with the sequence of the plurality of log entries; and
determining, based on the ordinal position in the sequence of the plurality of log entries and issue associated with the sequence of the plurality of log entries, the anomaly associated with the sequence of the plurality of log entries.

8. The method of claim 1, further comprising:
providing information identifying the anomaly associated with the sequence of the plurality of log entries for display.

9. The method of claim 1, further comprising:
causing information identifying the anomaly associated with the sequence of the plurality of log entries and the information associated with the resource to be analyzed using a root cause analysis technique,
wherein causing the information identifying the anomaly associated with the sequence of the plurality of log entries and the information associated with the resource to be analyzed using the root cause analysis technique is to cause an origin of the anomaly associated with the sequence of the plurality of log entries to be identified.

10. The method of claim 9, further comprising:
providing, for display, at least one of the information identifying the anomaly associated with the sequence of the plurality of log entries, the information associated with the resource, or information identifying the origin of the anomaly associated with the sequence of the plurality of log entries.

11. A non-transitory computer-readable medium storing a set of instructions, the set of instructions comprising: one or more instructions that, when executed by one or more processors of a device, cause the device to: identify, in a log file, a sequence of a plurality of log entries that are associated with a resource, of the device or another device, associated with the device or the other device encountering an issue with one or more log entries of the plurality of log entries; generate, based on the sequence of the plurality of log entries, a sequence of a plurality of log templates, wherein each log template of the sequence of the plurality of log templates corresponds to a particular log entry of the sequence of the plurality of log entries; process the sequence of the plurality of log templates to identify an anomaly associated with the sequence of the plurality of log entries; obtain, based on determining the anomaly associated with the sequence of the plurality of log entries, information associated with the resource; and modify one or more configuration parameters, based on the information associated with the resource, to automatically take action to address the anomaly associated with the sequence of the plurality of log entries.

12. The non-transitory computer-readable medium of claim 11, wherein the one or more instructions, that cause the device to process the sequence of the plurality of log templates to identify the anomaly associated with the sequence of the plurality of log entries, cause the device to:
process, using a machine learning model, the sequence of the plurality of log templates to identify an anomaly associated with the sequence of the plurality of log templates; and
determine, based on the anomaly associated with the sequence of the plurality of log templates, the anomaly associated with the sequence of the plurality of log entries.

13. The non-transitory computer-readable medium of claim 11, wherein the anomaly associated with the sequence of the plurality of log entries includes at least one of:
information indicating a first ordinal position in the sequence of the plurality of log entries where a first log entry is missing from the sequence of the plurality of log entries;
information indicating a second ordinal position in the sequence of the plurality of log entries where a second log entry, of the sequence of the plurality of log entries, is incorrectly positioned in the sequence of the plurality of log entries; or
information indicating a third ordinal position in the sequence of the plurality of log entries where a third log entry, of the sequence of the plurality of log entries, is repeated in the sequence of the plurality of log entries.

14. The non-transitory computer-readable medium of claim 11, wherein the one or more instructions, when executed by the one or more processors, cause the device to:
send a notification identifying the anomaly associated with the sequence of the plurality of log entries to the other device.

15. A device, comprising: one or more memories; and one or more processors, coupled to the one or more memories, configured to: identify a sequence of a plurality of log entries, included in one or more log files, that are associated with a resource, of the device or another device, associated with the device or the other device encountering an issue with one or more log entries of the plurality of log entries; generate, based on the sequence of the plurality of log entries, a sequence of a plurality of log templates, wherein each log template of the sequence of the plurality of log templates corresponds to a particular log entry of the sequence of the plurality of log entries; process, using one or more machine learning models, the sequence of the plurality of log templates to identify an anomaly associated with the sequence of the plurality of log templates; determine, based on the anomaly associated with the sequence of the plurality of log templates, an anomaly associated with the sequence of the plurality of log entries; obtain, based on determining the anomaly associated with the sequence of the plurality of log entries, information associated with the resource; and modify one or more configuration parameters, based on the information associated with the resource, to automatically take action to address the anomaly associated with the sequence of the plurality of log entries.

16. The device of claim 15, wherein the one or more machine learning models includes a long short-term memory (LSTM) model.

17. The device of claim 15, wherein the anomaly associated with the sequence of the plurality of log templates includes information identifying an ordinal position in the sequence of the plurality of log templates and an issue associated with the sequence of the plurality of log templates.

18. The device of claim 15, wherein the one or more processors, to determine the anomaly associated with the sequence of the plurality of log entries, are configured to:
identify, based on an ordinal position in the sequence of the plurality of log templates indicated by the anomaly associated with the sequence of the plurality of log templates, an ordinal position in the sequence of the plurality of log entries;

identify, based on an issue associated with the sequence of the plurality of log templates indicated by the anomaly associated with the sequence of the plurality of log templates, an issue associated with the sequence of the plurality of log entries; and determine, based on the ordinal position in the sequence of the plurality of log entries and the issue associated with the sequence of the plurality of log entries, the anomaly associated with the sequence of the plurality of log entries.

19. The device of claim 15, wherein the one or more processors are further configured to:

provide the information identifying the anomaly associated with the sequence of the plurality of log entries.

20. The device of claim 19, wherein the one or more processors, to provide the information identifying the anomaly associated with the sequence of the plurality of log entries, are configured to:

display the information identifying the anomaly associated with the sequence of the plurality of log entries.

\* \* \* \* \*